(12) United States Patent
Coutts et al.

(10) Patent No.: US 7,739,144 B2
(45) Date of Patent: Jun. 15, 2010

(54) SELF-SERVICE TERMINAL

(75) Inventors: Michael G. Coutts, Dundee (GB); Lee G. Dove, Coupar Angus (GB)

(73) Assignee: NCR Corporation, Duluth, GA (US)

( * ) Notice: Subject to any disclaimer, the term of this patent is extended or adjusted under 35 U.S.C. 154(b) by 2082 days.

(21) Appl. No.: 09/826,680

(22) Filed: Apr. 5, 2001

(65) Prior Publication Data

US 2001/0029528 A1    Oct. 11, 2001

(30) Foreign Application Priority Data

Apr. 7, 2000    (GB) .................................. 0008495.4

(51) Int. Cl.
*G06Q 30/00*    (2006.01)
(52) U.S. Cl. .................................... 705/14.1
(58) Field of Classification Search ............. 705/14, 705/16, 21, 26, 27, 43, 14.1
See application file for complete search history.

(56) References Cited

U.S. PATENT DOCUMENTS 5,870,724 A * 2/1999 Lawlor et al. ................. 705/42
5,933,811 A * 8/1999 Angles et al. ................. 705/14
6,487,538 B1 * 11/2002 Gupta et al. ................... 705/14
2005/0216888 A1 * 9/2005 Drummond et al. ......... 717/113

FOREIGN PATENT DOCUMENTS

| EP | 0903903 | 3/1999 |
| GB | 2338145 | 12/1999 |
| JP | 9305519 | 11/1997 |
| JP | 11242773 | 9/1999 |
| WO | 9605564 | 2/1996 |
| WO | 9611436 | 4/1996 |

* cited by examiner

*Primary Examiner*—Daniel Lastra
(74) *Attorney, Agent, or Firm*—Michael Chan, Esq.; Gregory Welte, Esq.

(57) ABSTRACT

A self-service terminal (20) for displaying advertisements is described. The terminal comprises a display (52) and a network connection (32). The terminal further comprises means for accessing an advertisement database (18) to retrieve an advertisement associated with the terminal (20), and means for incorporating the retrieved advertisement in a screen (130) for displaying on the display (52). The terminal (20) may be an ATM. A method of supplying an advertisement for displaying on a self-service terminal, and a system for controlling presentation of advertisements on a self-service terminal are also described.

1 Claim, 7 Drawing Sheets

FIG. 9 http://domain name/directory?parameters

FIG. 10 http://www.adserver.xyz.com/get_add?ATM3,0930,342XX532

SELF-SERVICE TERMINAL

BACKGROUND OF THE INVENTION

The present invention relates to a self-service terminal (SST), such as an automated teller machine (ATM), for displaying advertisements. In particular, the invention relates to an ATM for displaying authorized advertisements during a transaction.

Owners of ATMs sometimes attempt to offset the high cost of owning and maintaining an ATM by renting out screen space to a third party, such as a vendor, for displaying advertisements for the goods and/or services provided by the third party. Vendors lease screen space because it enables them to advertise their goods and/or services to ATM users without having the expense of owning and maintaining an ATM.

Typically, screen space is rented out during a "dead time" in a transaction. A "dead time" is a period during which a user is not required to enter any data or to view any data, but during which the ATM is occupied, for example, when a financial transaction is being authorized by an ATM host, when cash is being counted and staged, when a receipt is being printed, or such like.

One problem associated with renting out screen space to vendors is that the ATM application that controls the flow of screens presented to a user of the ATM is very complex. This makes it very difficult and time consuming to modify the ATM application to include an advertisement in a screen. As a result, owners of ATMs are reluctant to allow the vendors to change their advertisements too frequently. For some vendors, the goods or services that they advertise via the ATM may have limited availability, or the price of the goods and/or services may change frequently. This means that it may not be convenient to advertise the goods and/or services as part of a long term advertisement. Other vendors are small businesses who may not be able to afford the expense involved in incorporating an advertisement in the ATM application.

Another problem is that the same advertisement is used for every user of the ATM, regardless of the location of the ATM, the time at which the ATM is being used, and such like.

SUMMARY OF THE INVENTION

It is among the objects of an embodiment of the invention to obviate or mitigate one or more of the above disadvantages or other disadvantages associated with SSTs for displaying advertisements.

According to a first aspect of the present invention there is provided a self-service terminal for displaying advertisements, the terminal comprising a display and a network connection, characterized in that the terminal comprises means for accessing an advertisement database to retrieve an advertisement associated with the terminal, and means for incorporating the retrieved advertisement in a screen for displaying on the display.

The term "screen" is used herein to denote the graphics, text, controls (such as menu options), and such like, that are displayed on an SST display; the term "screen" as used herein does not refer to the hardware (for example, the LCD, CRT, or touchscreen) that displays the graphics, text, controls, and such like. Typically, when a transaction is being entered at an SST, a series of screens are presented in succession on the SST display. For example, a first screen may request a user to insert a card, a second screen may invite the user to enter his/her PIN, a third screen may invite the user to select a transaction, and so on.

The term "advertisement" is used herein to include a notification or announcement associated with: marketing of goods and/or services; special offers relating to goods and/or services; brand awareness campaigns; and such like. The notification may be animated or still. The term "advertisement" is also intended to include an artificial language description of text and/or image and/or sound data which can be processed to generate a notification or announcement.

By virtue of this aspect of the invention, an advertisement is stored on a database rather than on the terminal. This allows a single database to be used for multiple terminals, so that each terminal accesses the same database. Each terminal can have its own database entry within this database. This also allows a third party to update the advertisement at the database rather than at the terminal. As each advertisement is associated with one or more terminals, it is possible to determine at the database which terminals will display the advertisement.

Preferably, the database stores a plurality of advertisements for each terminal, and includes rules for selecting an advertisement, so that a particular advertisement may be selected, for example, because of the time at which the database is accessed. The rules may be implemented by a calendar for scheduling display of advertisements.

Preferably, the means for accessing the advertisement database to retrieve an advertisement includes a Web browser (such as Microsoft (trade mark) Internet Explorer or Netscape (trade mark) Communicator) or a Web browser component (such as the HotJava HTML component from Sun (trade mark)).

Preferably, the Web browser or Web browser component is embedded in a program that controls the operation of the SST. Preferably, the Web browser or browser component is operable to connect only to the database and not to other Web sites.

Preferably, the means for accessing the advertisement database includes a program for transmitting an identifier to the database. The identifier may identify the SST, the user of the SST, and such like information. The identifier may be a URL (uniform resource locator) or a field within a URL.

Preferably, the means for incorporating the retrieved advertisement in a screen includes a terminal program for executing the Web browser or browser component.

Preferably, the terminal program is operable to allocate screen space to the Web browser or Web browser component in accordance with predefined allocation times. The allocation times may include: "dead time" during a transaction; a period prior to a user entering his/her card; or such like.

According to a second aspect of the invention there is provided a method of displaying advertisements on a self-service terminal, characterized by the steps of: accessing a database of authorized advertisements, retrieving from the database an authorized advertisement associated with the terminal, and displaying the retrieved advertisement.

The step of retrieving an authorized advertisement from the database may include the further step of providing the database with an identifier associated with the terminal.

According to a third aspect of the invention there is provided a method of supplying an advertisement for displaying on a self-service terminal, characterized by the steps of: accepting via a network an identification signal from a terminal located on the network, accessing an advertisement database to retrieve an authorized advertisement associated with that terminal, and transmitting the retrieved advertisement to the terminal for displaying at that terminal.

Preferably, the method includes the further step of logging the number of times the advertisement database has been accessed by each terminal, and applying a charge to each advertisement based on the number of accesses.

Each terminal may have a plurality of advertisements associated with it. The advertisement that is retrieved may depend on the time at which the database was accessed.

According to a fourth aspect of the invention there is provided a computer readable medium having stored thereon instructions for causing a processing unit to execute the method of the second aspect of the invention.

According to a fifth aspect of the invention there is provided a computer readable medium having stored thereon instructions for causing a processing unit to execute the method of the third aspect of the invention.

According to a sixth aspect of the invention there is provided a system for controlling presentation of advertisements on a self-service terminal, comprising a self-service terminal interconnected to a server; characterized in that the system comprises an advertisement database for storing authorized advertisements; and the server is operable to access the advertisement database in response to a request from the terminal, to retrieve an advertisement associated with the terminal, and to transmit the retrieved advertisement to the terminal for displaying at the terminal.

Preferably, the system is configured to allow an authorized user to update the stored advertisements.

Preferably, the server is configured to allow a user to enter descriptive fields relating to an advertisement. The descriptive fields may include the text used, the font size, the color, the images used, and such like.

Preferably, the server includes a JAVA (trade mark) Servlet associated with each descriptive field (hereinafter referred to as a "field Servlet"), so that the field Servlet for each field translates the entry for that field into a format for generating HTML (hypertext markup language) therefrom, and stores the translated entry as part of a database entry for an advertisement. As a result of the activity of the field Servlets, each database entry comprises a plurality of translated entries which together form an artificial language advertisement. This allows a different Servlet (hereinafter referred to as a "database Servlet") to generate an HTML page (an advertisement as it appears to a user) from the database entry (which is an artificial language version of the advertisement appearing to a user).

Preferably, the system includes a screening system for screening each advertisement to determine if the information fulfils an acceptance criterion.

Preferably, each advertisement is screened (vetted) prior to storing the advertisement in the database. In a particularly preferred embodiment, the descriptive fields are screened prior to being stored in the database. For example, a text field may be screened by keyword searching, an image field may be screened for excessive skin tone content, and such like.

Alternatively, each advertisement may be stored in the database prior to being screened, but may only be accessed when the advertisement has been screened.

The acceptance criterion may include the absence of certain words deemed offensive, for example, because of a perceived racial, sexual, or political connotation. The acceptance criterion may also include the absence of a large percentage of certain colors in an image, for example, skin tones.

The acceptance criterion may be administered automatically by an expert system, a rules engine, one or more intelligent agents, or such like. Alternatively, the acceptance criterion may be administered by the advertisement or the appropriate descriptive fields (for example, the text and image fields) being relayed to a person authorized to approve the content. The relaying mechanism may be email, intelligent agents, or any other convenient mechanism. Where an intelligent agent is used, if an authorized person does not review the advertisement or descriptive fields within a predetermined time the agent may move to another authorized person, and so on until an authorized person is available to review the advertisement or descriptive fields.

The advantage of using a screening system is that the owner of the terminal is able to ensure that the graphical and textual content of information displayed on the terminal is not detrimental to the owner's brand name or liable to cause offence to the owner or to a user of the SST.

The advantage of storing the advertisements on a database is that the database can provide a secure repository for authorized advertisements.

The advantage of using descriptive fields to describe an advertisement is that a simple interface can be provided for describing an advertisement. This means that a campaign manager does not need to know how to create a Web page.

According to a seventh aspect of the invention there is provided a self-service terminal operable to connect to a first server for authorizing a transaction, and to a second server for retrieving an authorized advertisement associated with the terminal for displaying to a user of the terminal.

Preferably, the terminal connects to the second server at least once during each transaction.

The first server may be accessible only through a private network, such as an Intranet; whereas, the second server may be accessible through a public network, such as the Internet, or a private network, such as an Intranet or an Extranet.

According to an eighth aspect of the present invention there is provided a method of offsetting the cost of owning an SST, the method comprising the steps of: providing a database for storing advertisements, allowing an authorized user to access the database and to transmit an advertisement to the database for storing therein, screening the transmitted advertisement to ensure that it meets an acceptance criterion, storing the screened advertisement in a database entry associated with a self-service terminal, and charging a fee each time the advertisement is accessed by the terminal.

The fee may be charged to the authorized user or to a party associated with the authorized user.

Part of the fee may be credited to an account associated with the owner of the SST on which the advertisement was displayed.

Using a database to store all of the authorized advertisements allows centralized tracking of what advertisements are shown on what SST, which simplifies the process of charging for the advertisements.

The method may include the further step of applying a display criteria to the screened advertisement.

According to a ninth aspect of the present invention there is provided a network of self-service terminals comprising a server interconnected to a plurality of SSTs, characterized in that the network includes a database of authorized advertisements, each advertisement having an associated display criteria, whereby each SST is operable to request an authorized advertisement from the database, and the server is operable to match an authorized advertisement with each SST based on the display criteria.

Each advertisement in the database may be associated with a different SST in the network.

Each SST in the network may access an advertisement using the same request as the other SSTs in the network.

The server may allow a campaign manager to store images and text strings, so that these images and text strings are approved for use in an advertisement. This allows the manager to update an advertisement using the stored images and text strings, thereby avoiding the need to have the new advertisement screened.

The SSTs may be ATMs, information kiosks, a combination of these, or such like.

According to a tenth aspect of the present invention there is provided a method of managing an advertising campaign for distribution through an SST network, the method being characterized by the steps of: transmitting an advertisement to a database for authorization and storage therein, and associating display criteria with the advertisement, where the display criteria determines when and where the advertisement is shown.

The display criteria may include one or more of: the terminals on which the advertisement is to be shown, the users to which the advertisement is to be shown, the time at which the advertisement is to be shown, and such like.

According to an eleventh aspect of the present invention there is provided a method of leasing advertising space on a screen of one or more SSTs in a network of SSTs, characterized by the steps of: providing a database for storing authorized advertisements; allowing a third party to access the database and to transmit an advertisement thereto; screening the transmitted advertisement; in the event of the screened advertisement meeting an acceptance criterion, storing the transmitted advertisement; associating display criteria with the stored advertisement; transmitting the stored advertisement to any request from a terminal fulfilling the display criteria; and applying a charge to an account associated with the third party.

According to a twelfth aspect of the invention there is provided an advertisement brokerage system, the system comprising a network of self-service terminals, and a server, where the system includes: means for receiving and storing advertisement data, means for screening the advertisement data, means for applying display criteria to the advertisement data, and means for transmitting the advertisement data to one or more terminals in accordance with the display criteria.

It will now be appreciated that aspects of the present invention have the advantage that an owner of an SST can lease screen space to third parties, and allow third parties to create and modify advertisements as often as desired, without requiring any changes to be made to an SST control program resident on the SST.

Aspects of the present invention also have the advantage that the SST owner can ensure that the adverts do not contain any undesirable text or images, that is, the SST owner maintains some control over the adverts that will be displayed.

Aspects of the present invention also have the advantage that different advertisements may be shown on an SST depending on the time of day, the location of the SST, the user of the SST, or such like.

BRIEF DESCRIPTION OF THE DRAWINGS

These and other aspects of the invention will be apparent from the following specific description, given by way of example, with reference to the accompanying drawings, in which:

FIG. 9 shows the format of an HTTP URL used to specify a resource on the server of FIG. 2; and FIG. 10 illustrates a typical URL for requesting an advertisement from the database of FIG. 1.

DETAILED DESCRIPTION

Figure 1:
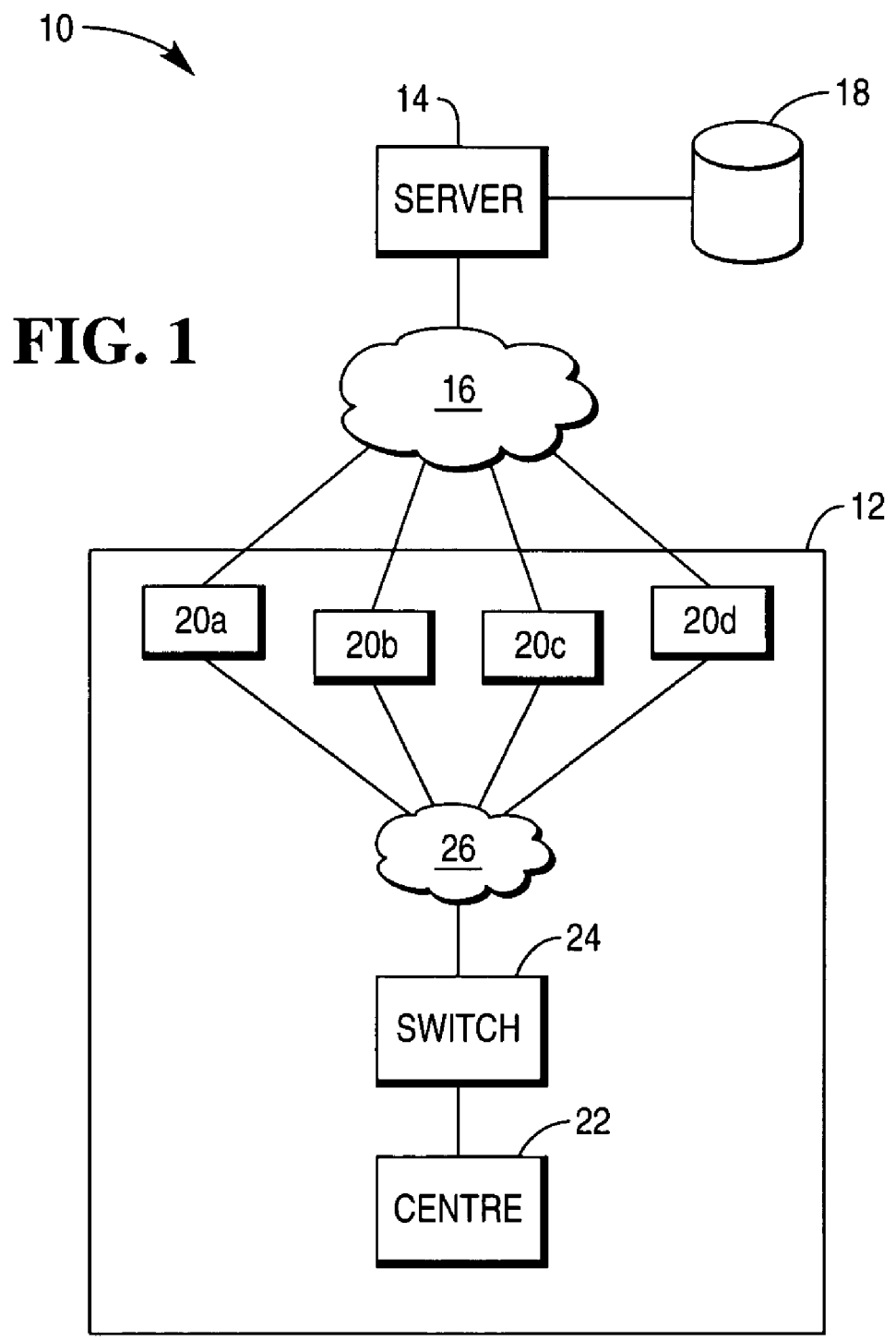
FIG. 1 is a block diagram of an SST system according to one embodiment of the invention.

Referring to FIG. 1, which shows an SST system 10 in the form of an ATM system. ATM system 10 comprises an ATM network 12 connected to a server 14 via a public access network 16 in the form of the Internet. The server 14 is connected to a database 18 for storing advertisements.

The ATM network 12 comprises a plurality of ATMs 20 (four of which, 20*a*,20*b*,20*c*,20*d*, are shown in FIG. 1) interconnected to a financial institution's authorization center 22 via a switching device 24 and a secure private network 26 in the form of an Intranet.

In a similar way as for conventional ATM networks. The switching device 24 is used for routing financial transaction authorization requests from the ATMs 20 to the authorization center 22. As will be appreciated by those of skill in the art, the switching device 24 and the authorization center 22 may be incorporated into a single server (an authorization server). It will also be appreciated that the switching device 24 is able to route authorization requests to authorization centers operated by other financial institutions and to financial services companies.

Figure 2:
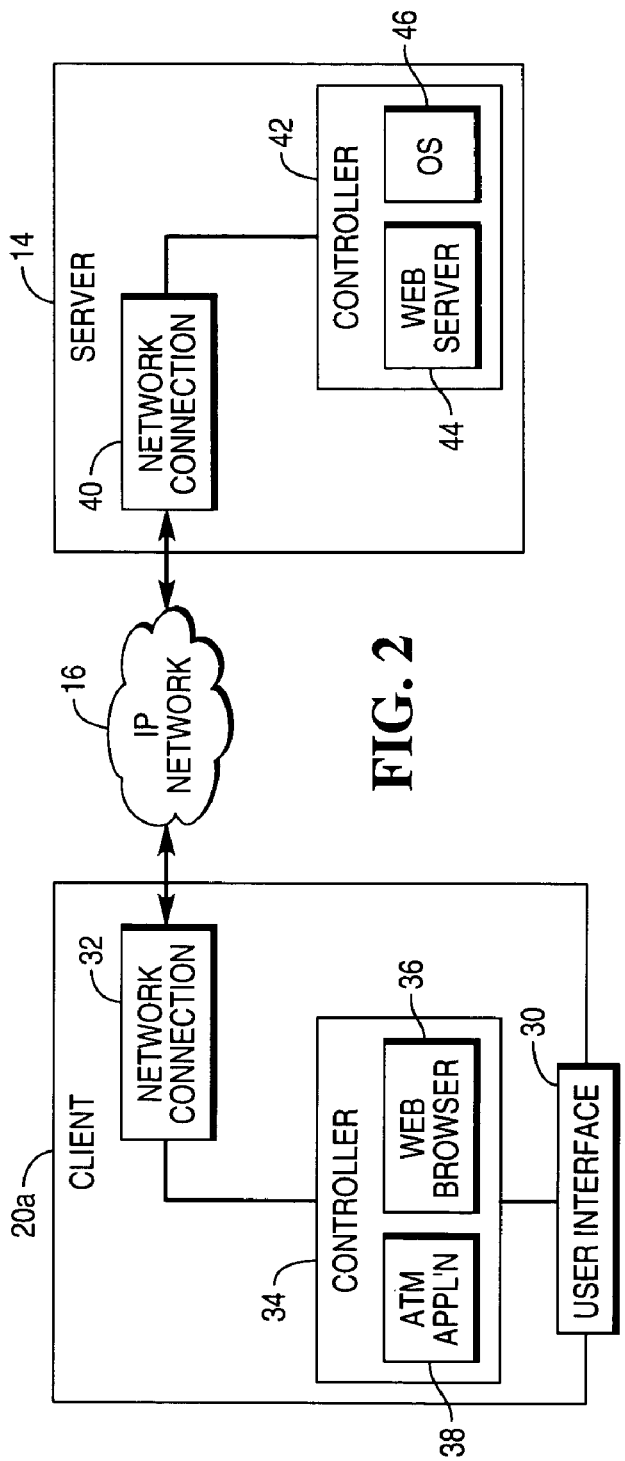
FIG. 2 is a block diagram showing a terminal and a server of FIG. 1 in more detail.

Reference is now made to FIG. 2, which is a block diagram showing one of the ATMs 20*a* and the server 14 of FIG. 1 in more detail. ATM 20*a* operates as a client of server 14 and includes: a user interface 30; a network connection 32 providing a link to the server 14 via the Internet 16; and a controller 34 for controlling the operation of the ATM 20*a*. The controller 34 incorporates an embedded Web browser component 36 and an ATM application 38 for controlling modules in the ATM 20*a*.

The server 14 also has a network connection 40 and a controller 42 incorporating a Web server 44 and a server operating system 46 for controlling the server 14.

Figure 3:
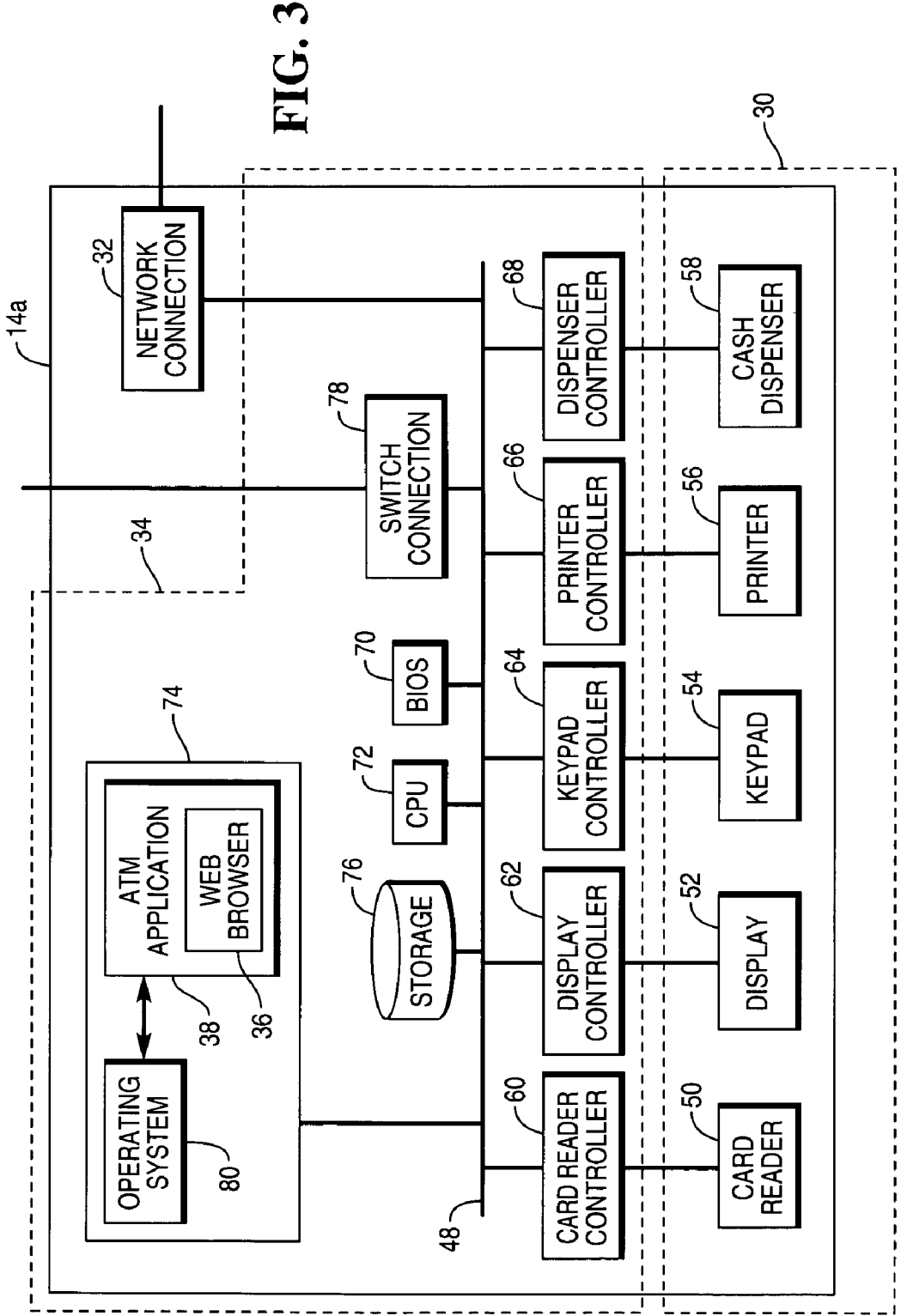
FIG. 3 is a block diagram showing the terminal of FIG. 2 in more detail.

Referring to FIG. 3, which shows ATM 20*a* in more detail, a system bus (or a plurality of system buses) 48 interconnects the network connection 32 and the controller 34 to allow mutual intercommunication, and also connects various modules within the controller 34, as described below.

The user interface 30 comprises the following user interface elements (peripheral devices): a card reader 50, a display 52, an encrypting keypad 54, a printer 56, and a cash dispenser 58.

The controller 34 comprises modules for driving the user interface elements 50 to 58, namely: card reader controller 60, display controller 62, keypad controller 64, printer controller 66, and dispenser controller 68. These user interface elements (50 to 58) and associated controllers (60 to 68) are standard modules that are used on conventional ATMs and will not be described in detail herein.

The controller 34 also comprises a BIOS 70 stored in non-volatile memory, a microprocessor 72, associated main memory 74, storage space 76 in the form of a magnetic disk drive, and a dedicated switch connection 78 for connecting the ATM 20*a* to the authorization center 22 (FIG. 1).

The embedded Web browser component 36 is a HotJava (trade mark) browser bean component which is embedded within the ATM application 38. For simplicity, hereinafter the embedded browser component 36 will be referred to as a browser or a Web browser.

In use, the main memory 74 is loaded with the ATM operating system kernel 80, and the ATM application 38 for controlling the operation of the ATM 20*a*.

The ATM application 38 includes the sequence of screens used in each transaction flow. The ATM application 38 is configured so that each screen that is presented to a user during a "dead time" includes screen space that is allocated to the Web browser 36. "Dead times" include, for example, when the ATM 20*a* requests authorization of a transaction, when the ATM 20*a* prints a receipt or a statement, or such like event.

Figure 4:
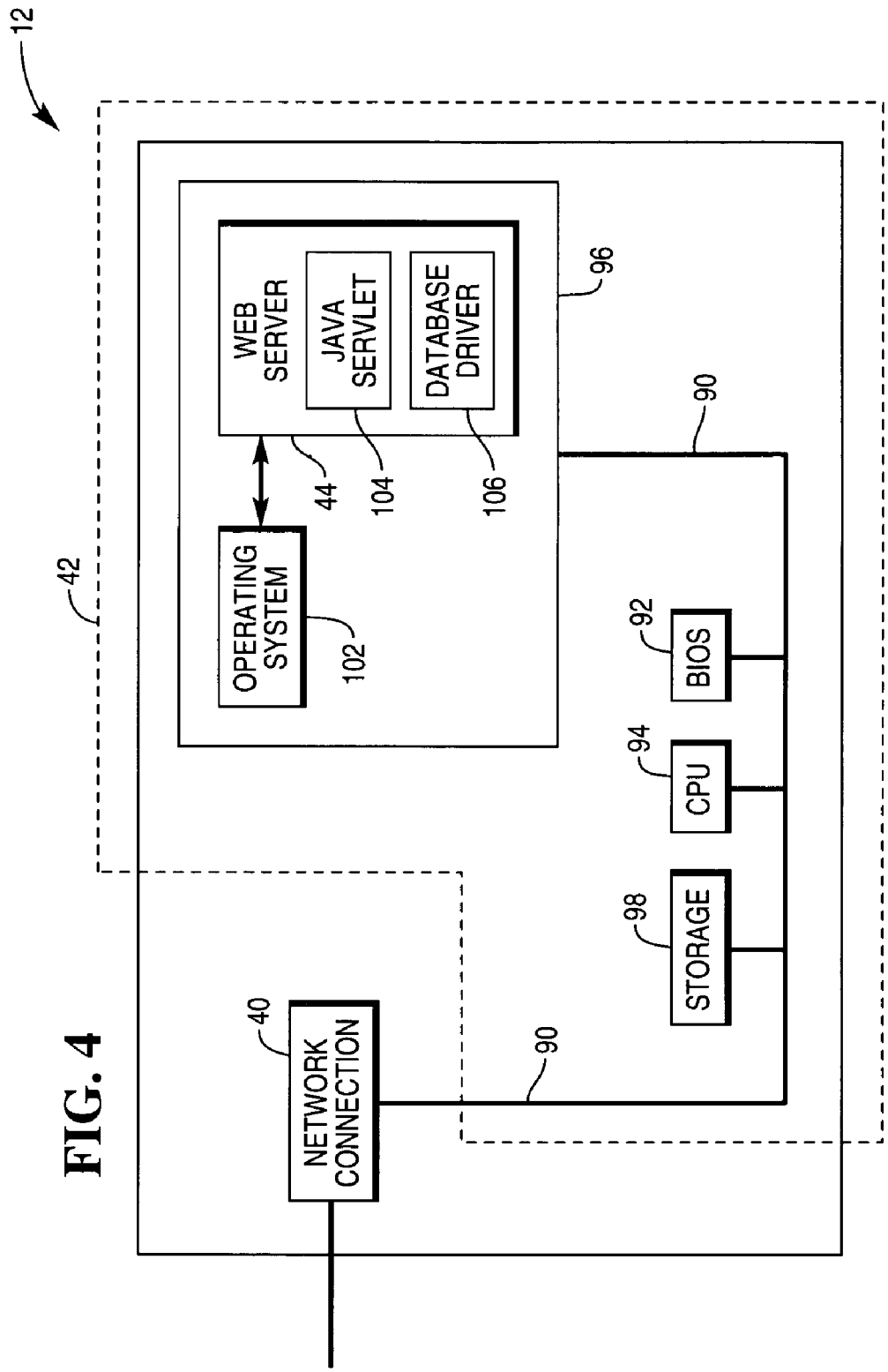
FIG. 4 is a block diagram showing the server of FIG. 2 in more detail.

Referring to FIG. 4, which shows remote server 14 in more detail, a system bus (or buses) 90 connects the network connection 40 to the controller 42. The controller 42 further comprises a BIOS 92 stored in non-volatile memory, a microprocessor 94, associated main memory 96, and storage space 98 in the form of a magnetic disk drive.

The server operating system 46 and the Web server 44 are stored on the magnetic drive 98. In use, the main memory 96 is loaded with the server operating system kernel 102 and the Web server 44. In this embodiment the Web server 44 is the Java Web Server (trade mark).

The Java Web server 44 includes a server application 104 for invoking two types of Java Servlets (104*a*,104*b*), and the server 44 supports a database application programming interface (API) 106 in the form of a JDBC (Java DataBase Connectivity) API for accessing database 18 (FIG. 1).

The Java Servlets 104 perform a number of different tasks, as will be described in more detail below. The Java Web Server 44 also provides session management, thread management, administration and security features; as is well known to those of skill in the art.

The database application interface 106 is a database driver that provides SQL access to the database 18. The Java Servlets use the JDBC API 106 to obtain information from the database 18 for use in generating HTML files in response to a request from an ATM 20.

A Java Servlet is software code that is used to generate information dynamically. Each Servlet must be registered with the Web server so that the Web server can distinguish between a request for a Servlet and a request for a Web page. When a registered Servlet is requested by a remote Web browser, the Web server instantiates the Servlet. Once instantiated, the Servlet remains in memory for a period of time awaiting further invocation by the Web browser.

When a third party (such as a campaign manager for a particular product line) wishes to rent advertising space on one or more of the ATMs 20 (FIG. 1) in ATM network 12, the financial institution that owns the ATM network 12 (FIG. 1) creates an account for the third party and provides the campaign manager with a log-in facility (which may include a username and a passcode) to allow the campaign manager to access the server 14.

Figure 5:
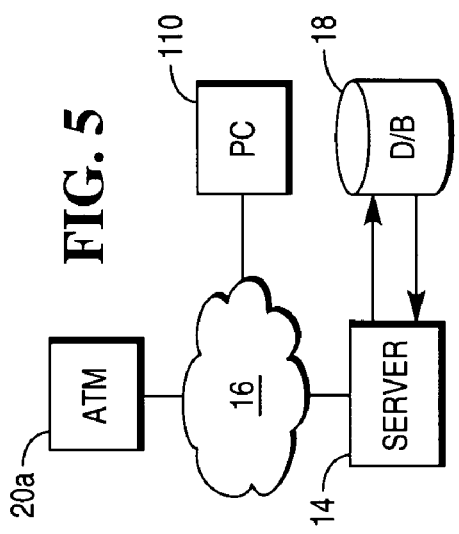
FIG. 5 is a block diagram illustrating the interaction between some of the components in the system of FIG. 1.

Referring to FIG. 5, the campaign manager can access the server 14 using a personal computer (PC) 110 having Internet access. After logging-in to the server 14, the campaign manager can enter a description of an advertisement comprising text data and/or image data and/or sound data for storing on the database 18. The advertisement may include animation and/or still images.

Figure 6:
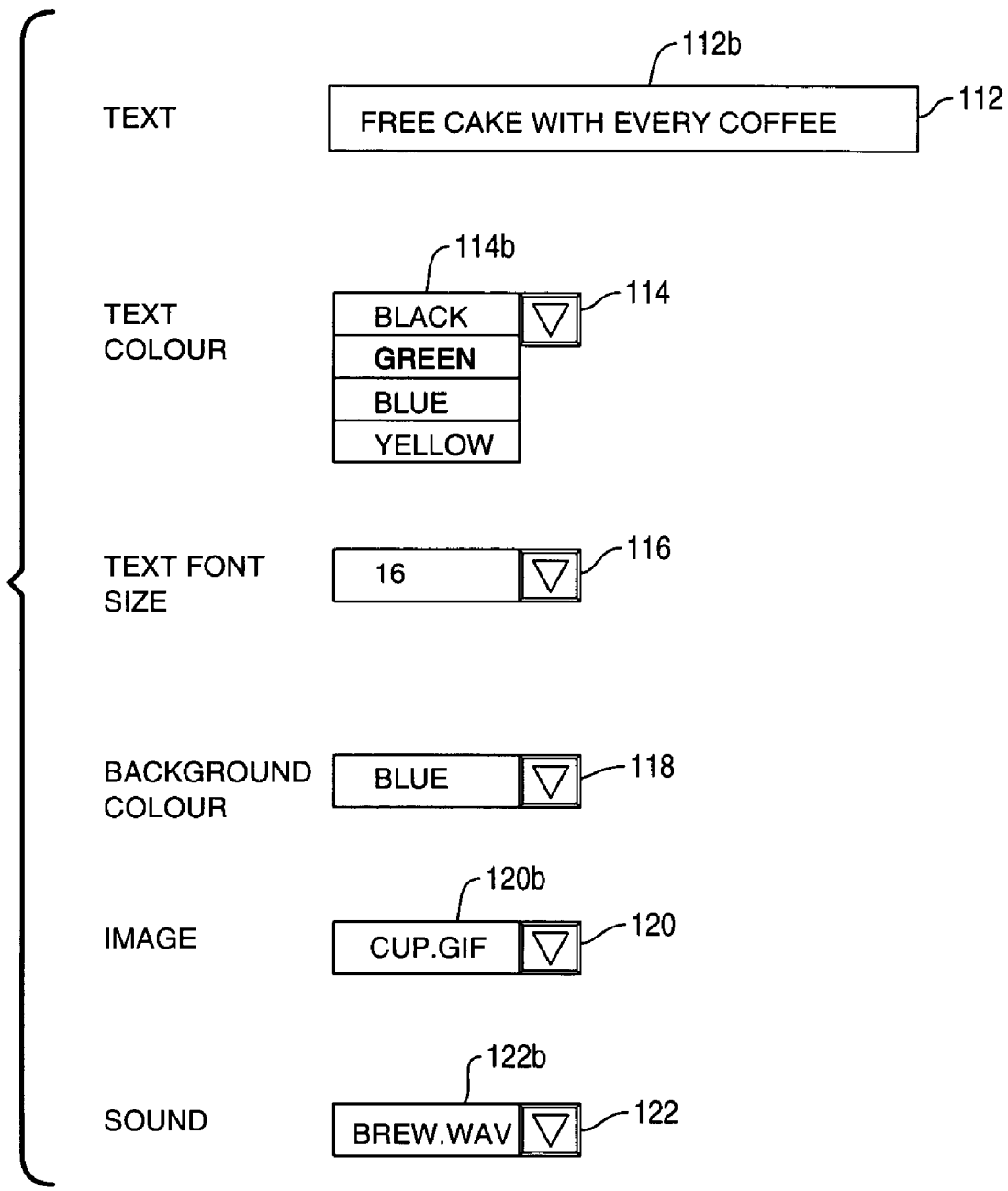
FIG. 6 illustrates a set of descriptive fields provided by the server of FIG. 2 for use in preparing an advertisement.

In this embodiment, the server 14 is configured for use by campaign managers who are not specialists at designing Web pages. To assist these managers, the server 14 instantiates a series of Servlets (field Servlets 104*a*). Each field Servlet 104*a* presents the manager with a descriptive field for receiving an entry, as shown in FIG. 6. The first field shown in FIG. 6 is a text field 112 which allows the manager to type in the text to be displayed as part of the advertisement. The second field 114 is a text color field, the third field 116 is a text font size field, the fourth field 118 is a background color field, the fifth field 120 is an image field, and the sixth field 122 is a sound file field.

Where there is a limited number of options available, for example fields 114 to 118, a drop-down menu format is used to facilitate rapid selection by the manager. For field 114, arrow 114*a* presents the user with the various possibilities for selection; in FIG. 6, the "green" option is being selected for field entry 114*b*.

Where a manager has previously composed an advertisement, the previous entries are added to the respective drop-down menus. Thus, if a manager has previously used an image, then that image file is listed in the drop-down menu of field 120. A manager may upload a plurality of images for use in a future advertisement.

The server 14 may allow the user to enter formatting information so that the format of the advertisement can be chosen by the campaign manager.

The field Servlet associated with each field (114 to 122) translates the field entry into a format for generating HTML.

The campaign manager is then prompted to enter display criteria that determine when and where the advertisement is shown. The display criteria include:

(1) the ATMs 20 on which the advertisement is to be displayed, for example, ATMs 20*a* and 20*c*;

(2) the times at which the advertisement is to be displayed, for example, Wednesday mornings between 10 and 11.30 am; and/or (3) the number of transactions within a particular time period during which the advertisement is to be displayed, for example, not more than fifty transactions, every second transaction, or such like.

The server 14 presents the manager with a calendar indicating the availability of ATMs 20 in the network 12 for displaying advertisements, to allow the manager to schedule display of the advertisement.

The Servlet for the text field 112, the Servlet for the image field 120, and the Servlet for the sound field 122, each conveys its respective entry (112*b*, 120*b*, 122*b*) via email to an authorized person for screening.

The authorized person may be an employee of the financial institution or a person contracted by the financial institution to screen proposed entries.

When the authorized person approves the text, image, and sound entries (112*b*, 120*b*, 122*b*), the translated field entries of fields 112 to 122 are stored in a single entry in the database 18. As will be described below, a database Servlet (104*b*) is able to generate a Web page from these translated field entries.

At any time the campaign manager may log-in to the server 14 and change the advertisement (by changing the field entries) and/or the display criteria. Any change to the advertisement that involves a new text entry (112*b*), image entry (120*b*), or sound entry (122*b*), results in the new entry or entries being conveyed to the authorized person for screening prior to being saved on the database 18.

An authorized person will not approve an entry if it does not meet an acceptance criterion. The acceptance criterion may be based on:

(1) for a text or sound entry, the absence of certain keywords that are deemed offensive or inappropriate for display on a public access terminal such as ATM 20a;

(2) for an image entry, the absence of a predetermined amount of skin tone.

The server 14 updates the calendar to record which ATMs 20 are being used for the new advertisement, so that the calendar provides a schedule indicating which advertisements are to be displayed on which ATMs 20 at each time of every day. The server 14 uses this calendar for determining which advertisement is to be transmitted to an ATM at any particular time.

The operation of ATM 20a will now be described with reference to FIGS. 3 and 7. Initially, a user inserts his card into the ATM 20a. On receiving the card, the ATM application 38 initiates a transaction (step 200) and presents a screen on the display inviting the user to enter his PIN.

The ATM application 38 then requests an advertisement (step 202) from the server 14 (as will be described in more detail below) and stores this advertisement in memory 74.

The ATM application 38 processes a transaction (step 204) according to the predefined application flow programmed in the ATM application 38. Those parts of the application flow which give rise to a "dead time", for example, where a cash withdrawal is to be authorized, include a routine for:

(1) allocating Web browser space on the screen associated with the "dead time" so that a Web browser window appears on the screen for the duration of the "dead time" and (2) activating the Web browser to display the stored advertisement (from step 202) in this allocated space.

Figure 7:
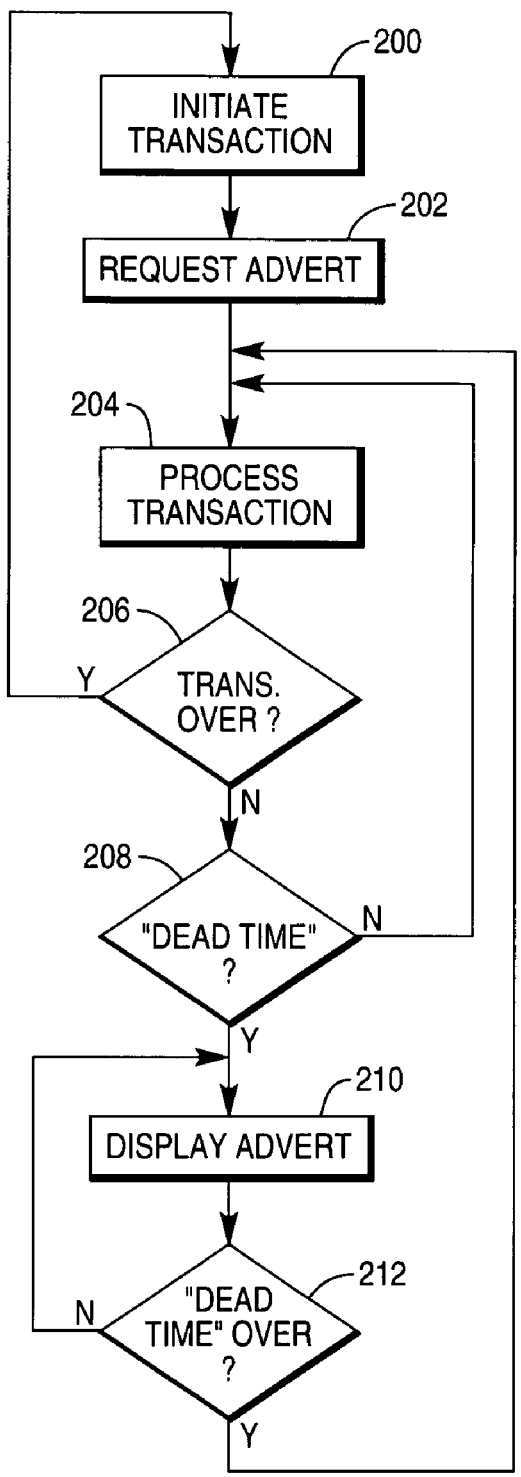
FIG. 7 is a flowchart illustrating the steps involved in displaying an advertisement on one of the terminals of FIG. 1.

This is illustrated in FIG. 7 by steps 206 to 210.

When the "dead time" is over, the allocated space is removed and the application flow proceeds (step 212).

Figure 8:
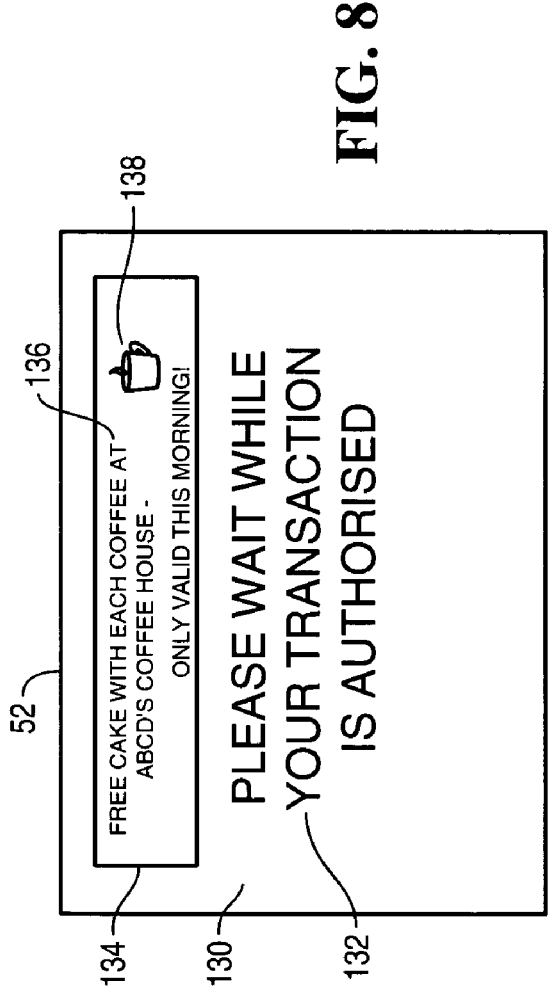
FIG. 8 is an illustration of a screen displayed during a "dead time" on one of the terminals of FIG. 1.

FIG. 8 illustrates a typical screen 130 presented on the display 52 during a transaction "dead time". The screen 130 includes transaction text 132 relating to the transaction being conducted, and allocated space 134 in which the embedded Web browser 36 (FIG. 3) is displaying an advertisement comprising advertising text 136 and an image 138.

The mechanism used for requesting an advertisement from the server 14 will now be described.

To request an advertisement from the database 18, Web browser 36 uses a URL (uniform resource locator) employing the hypertext transfer protocol (HTTP). The URL identifies the domain name of the server 14 and also a resource (a database Servlet 104b) on the server 14. The format of an HTTP URL is shown in FIG. 9. HTTP URL 150 has a protocol field 152 (in this case HTTP), a domain name field (or IP address field) identifying the server 154, a directory field 156 identifying the directory structure and resource name to be accessed on the server, and a parameters field 158 for passing information from a client to the server.

As illustrated in FIG. 10, the Web browser 36 is pre-programmed with an advertisement request URL 160 for accessing the database 18 via the server 14; in this embodiment the server's domain name 162 is "www.adserver.xyz.com", and the resource is "get_add" 164, which causes the server 14 to invoke a database Servlet 104b. The parameters field 166 is generated by the Web browser 36 immediately prior to sending the URL 160 because the parameters field 166 includes the identity of the client ATM 20a ("ATM3"), the time at which the request is made ("0930"), and the account number ("342XX532") of a user of the ATM 20a. As the time at which the request is made and the account number of the ATM user changes with each request, this information must be generated for each request.

When a "dead time" occurs in a transaction on ATM 20a, the Web browser 36 generates a new parameters field 166 and sends the advertisement request URL 160 (FIG. 10) to the web server 44.

It may not be necessary to include the identity of the ATM 20a in the parameters field because Internet datagrams include the IP address of the sender.

On receipt of the request URL 160 from the web browser 36, the web server 44 creates a session object for that web browser 36 to track the communications between that web browser 36 and the web server 44. Thus, the web server 44 creates and stores a unique session object associated with each web browser 36.

The Web server 44 also invokes a database Servlet 104b for determining which advertisement is to be shown based on the data in the parameters field 166 and the calendar. When the advertisement to be shown has been identified, the Servlet 104b accesses the associated database entry via the JDBC API 106, reads the translated field entries from the database entry, and operates on these entries to generate an HTML page. The Web server 44 then sends this HTML page to the ATM 20a for displaying within a screen thereon. The HTML page is an artificial language version of the advertisement, and has the graphical format and style selected by the campaign manager.

The database Servlet 104b responsible for creating and forwarding the HTML web page to the browser 36 also updates the session object by adding the ATM identifier from the request URL. Thus, for each web browser, the session object includes the identity of the ATM 20a executing the browser 36.

The database Servlet 104b also charges an account associated with the advertisement sent to the ATM 20a.

Thus, a user at the ATM 20a can view an advertisement from the database 18 without the terminal application 38 having to decide what advertisement to display.

In addition to sending an HTML page to the web browser 36, the database Servlet 104b also updates the session object associated with that browser 36 by copying advertisement information (but not the HTML page) to the session object. Thus, the session object maintains a copy of advertisement information sent to the web browser 36.

When the "dead time" is over, the ATM application 38 closes the Web browser 36 and the next screen in the application flow is presented to the user.

Various modifications may be made to the above described embodiment within the scope of the invention, for example, in other embodiments multiple authorized persons may be used to screen advertisements, and the server 14 may convey proposed advertisements to each authorized person in turn until an authorized person is available to screen the advertisements. Intelligent agent technology may be used to convey the advertisements between authorized persons.

In other embodiments, the screening process may be conducted automatically using software for detecting inappropriate keywords and/or inappropriate images, so that no human intervention is required to approve text and/or images in an advertisement.

In other embodiments, an advertisement may include one or more sound files for is playing during a "dead time".

In other embodiments, the server may allow a campaign manager to store images and text on the server for subsequent use. This has the advantage that a campaign manager can build up an array of authorized images and text, which can be used in an advertisement without any further authorization.

In other embodiments, the server may provide a Web page authoring facility for the campaign manager so that the manager can place the text and images where desired on a page and the server will construct a Web page in that format.

In other embodiments, the network connection 32 may be used to connect to the switching device 22 so that the dedicated switching device connection 78 is not required.

In other embodiments, the server 14 may use a non-standard port number (that is, not "80") for receiving advertisement requests from the ATMs 20.

In one type of embodiment the server may generate Web pages using PERL or CGI scripts. In a second type of embodiment Microsoft (trade mark) active server pages may be used instead of JAVA (trade mark) Servlets. In a third type of embodiment the server may generate web pages using dynamic HTML.

In other embodiments, an ATM may not include user identification details (such as an account number) in the request URL. The ATM may request an advertisement after each transaction is completed so that the advertisement is available immediately a "dead time" occurs.

What is claimed is:

1. A method of leasing advertising space on one or more automated teller machines (ATMs) in a network of ATMs which can dispense cash in the form of paper money, the method comprising the steps of:

providing a database for storing authorized advertisements;

allowing a third party to access the database and to transmit an advertisement thereto;

screening the transmitted advertisement;

in the event of the screened advertisement meeting an acceptance criterion, storing the transmitted advertisement, and if the advertisement fails to meet the criterion, rejecting it;

associating display criteria with the stored advertisement;

transmitting the stored advertisement to any request from an ATM fulfilling the display criteria; and applying a charge to an account associated with the third party, wherein all steps are undertaken by a single entity and its agents.

* * * * *